(12) United States Patent
Takase et al.

(10) Patent No.: US 12,117,239 B2
(45) Date of Patent: Oct. 15, 2024

(54) LIQUID HYDROGEN PRODUCTION FACILITY AND HYDROGEN GAS PRODUCTION FACILITY

(71) Applicant: KAWASAKI JUKOGYO KABUSHIKI KAISHA, Kobe (JP)

(72) Inventors: Tomonori Takase, Kakogawa (JP); Shoichiro Hayashi, Kakogawa (JP); Hideki Mori, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 915 days.

(21) Appl. No.: 17/043,108

(22) PCT Filed: Mar. 27, 2019

(86) PCT No.: PCT/JP2019/013273
§ 371 (c)(1),
(2) Date: Sep. 29, 2020

(87) PCT Pub. No.: WO2019/189409
PCT Pub. Date: Oct. 3, 2019

(65) Prior Publication Data
US 2021/0025651 A1    Jan. 28, 2021

(30) Foreign Application Priority Data

Mar. 29, 2018 (JP) ................... 2018-063762

(51) Int. Cl.
*F25J 1/00* (2006.01)
*F25J 1/02* (2006.01)
*C01B 32/50* (2017.01)

(52) U.S. Cl.
CPC ............. *F25J 1/001* (2013.01); *F25J 1/0221* (2013.01); *C01B 32/50* (2017.08); *F25J 2210/42* (2013.01); *F25J 2245/90* (2013.01)

(58) Field of Classification Search
CPC ........ F25J 1/001; F25J 1/0221; F25J 2210/42; C01B 32/50
See application file for complete search history.

(56) References Cited

U.S. PATENT DOCUMENTS

2015/0345859 A1* 12/2015 Hashizume .......... F25J 3/04309
62/606
2016/0230931 A1    8/2016 Reese et al.
2019/0137038 A1    5/2019 Reese et al.

FOREIGN PATENT DOCUMENTS

| JP | 2002-243360 A | 8/2002 |
| JP | 2003-81605 A | 3/2003 |
| JP | 2010-208913 A | 9/2010 |
| JP | 2016-84940 A | 5/2016 |
| WO | 2017/186336 A1 | 11/2017 |

OTHER PUBLICATIONS

English translation of WO 2017/186336 (Year: 2017).*

* cited by examiner

*Primary Examiner* — Paul A Wartalowicz
(74) *Attorney, Agent, or Firm* — Oliff PLC

(57) ABSTRACT

A reformer configured to generate hydrogen gas by reforming a hydrocarbon; a hydrogen liquefier configured to generate liquid hydrogen by liquefying the hydrogen gas; a reservoir for storing the liquid hydrogen; and a heat exchanger configured to cause heat exchange between boil-off gas that occurs in the reservoir and carbon dioxide that occurs during a process of generating the hydrogen gas to liquefy the carbon dioxide.

7 Claims, 3 Drawing Sheets

LIQUID HYDROGEN PRODUCTION FACILITY AND HYDROGEN GAS PRODUCTION FACILITY

TECHNICAL FIELD

The present invention relates to a liquid hydrogen production facility and a hydrogen gas production facility.

BACKGROUND ART

Conventionally, there have been known liquid hydrogen production facilities that produce liquid hydrogen by generating hydrogen gas from a hydrocarbon and liquefying the hydrogen gas. One of such liquid hydrogen production facilities is proposed by, for example, Japanese Laid-Open Patent Application Publication No. 2002-243360 (Patent Literature 1).

The liquid hydrogen production facility of Patent Literature 1 includes: a hydrogen gas generator and a hydrogen liquefier. The hydrogen gas generator generates hydrogen gas from natural gas that is obtained by vaporizing liquefied natural gas. The hydrogen liquefier liquefies the generated hydrogen gas. The liquid hydrogen production facility further includes a heat exchanger that is provided between the hydrogen gas generator and the hydrogen liquefier. The heat exchanger causes heat exchange between the liquefied natural gas and the generated hydrogen gas, thereby pre-cooling the hydrogen gas, and supplies the pre-cooled hydrogen gas to the hydrogen liquefier.

Patent Literature 1 gives no description regarding the treatment of carbon dioxide that occurs during the process of generating the hydrogen gas. Conventionally, CCS (Carbon dioxide Capture and Storage) has been adopted to treat the carbon dioxide. In CCS, the carbon dioxide is often liquefied. For example, Japanese Laid-Open Patent Application Publication No. 2010-208913 (Patent Literature 2) proposes a hybrid hydrogen supply station for efficiently liquefying the carbon dioxide.

The hybrid hydrogen supply station of Patent Literature 2 includes an on-site hydrogen supply station and an off-site hydrogen supply station. The on-site hydrogen supply station reforms natural gas by utilizing steam. The off-site hydrogen supply station receives liquid hydrogen, and supplies the liquid hydrogen or hydrogen gas. Carbon dioxide that occurs at the on-site hydrogen supply station is liquefied by a heat exchanger by utilizing the coldness of the liquid hydrogen that is extracted from the off-site hydrogen supply station.

CITATION LIST

Patent Literature

PTL 1: Japanese Laid-Open Patent Application Publication No. 2002-243360
PTL 2: Japanese Laid-Open Patent Application Publication No. 2010-208913

SUMMARY OF INVENTION

Technical Problem

However, the hybrid hydrogen supply station of Patent Literature 2 does not produce liquid hydrogen. The hybrid hydrogen supply station of Patent Literature 2 also has a problem in that since a part of liquid hydrogen stored in a reservoir is extracted and used for liquefying carbon dioxide, it causes a decrease in liquid hydrogen to be supplied to a consumer.

In view of the above, an object of the present invention is to provide a liquid hydrogen production facility capable of efficiently liquefying carbon dioxide that occurs during the process of generating hydrogen gas. Another object of the present invention is to provide a hydrogen gas production facility capable of liquefying carbon dioxide that occurs during the process of generating hydrogen gas without causing a decrease in liquid hydrogen to be supplied to a consumer.

Solution to Problem

In order to solve the above-described problems, a liquid hydrogen production facility according to one aspect of the present invention includes: a reformer configured to generate hydrogen gas by reforming a hydrocarbon; a hydrogen liquefier configured to generate liquid hydrogen by liquefying the hydrogen gas; a reservoir for storing the liquid hydrogen; and a heat exchanger configured to cause heat exchange between boil-off gas that occurs in the reservoir and carbon dioxide that occurs during a process of generating the hydrogen gas to liquefy the carbon dioxide.

According to the above configuration, the boil-off gas that occurs in the reservoir for storing the liquid hydrogen, and the carbon dioxide that occurs during the process of generating the hydrogen gas, are caused to exchange heat with each other, and thereby the coldness of the boil-off gas can be utilized as a cooling source for liquefying the carbon dioxide. This makes it possible to efficiently liquefy the carbon dioxide in the liquid hydrogen production facility.

A liquid hydrogen production facility according to another aspect of the present invention includes: a reformer configured to generate hydrogen gas by reforming a hydrocarbon; a hydrogen liquefier configured to generate liquid hydrogen by liquefying the hydrogen gas by cooling the hydrogen gas with use of heat of vaporization of liquid nitrogen; and a heat exchanger configured to cause heat exchange between nitrogen gas that is discharged from the hydrogen liquefier and carbon dioxide that occurs during a process of generating the hydrogen gas to liquefy the carbon dioxide.

According to the above configuration, the nitrogen gas that is discharged in a relatively low-temperature state from the hydrogen liquefier, and the carbon dioxide that occurs during the process of generating the hydrogen gas, are caused to exchange heat with each other, and thereby the coldness of the nitrogen gas can be utilized as a cooling source for liquefying the carbon dioxide. This makes it possible to efficiently liquefy the carbon dioxide in the liquid hydrogen production facility.

The hydrocarbon may be methane contained in liquefied natural gas as a major component.

According to the above configuration, methane contained in liquefied natural gas as a major component is supplied to the reformer. This makes it possible to efficiently liquefy the carbon dioxide that occurs during the process of generating the hydrogen gas by reforming the methane.

For example, the reformer may reform the hydrocarbon by steam reforming.

Further, in order to solve the above-described problems, a hydrogen gas production facility according to the present invention includes: a reformer configured to generate hydrogen gas by reforming a hydrocarbon; a reservoir for storing liquid hydrogen supplied from outside; and a heat exchanger configured to cause heat exchange between boil-off gas that occurs in the reservoir and carbon dioxide that occurs during a process of generating the hydrogen gas to liquefy the carbon dioxide.

According to the above configuration, the boil-off gas that occurs in the reservoir for storing the liquid hydrogen supplied from the outside, and the carbon dioxide that occurs during the process of generating the hydrogen gas, are caused to exchange heat with each other, and thereby the coldness of the boil-off gas can be utilized as a cooling source for liquefying the carbon dioxide. This makes it possible to liquefy the carbon dioxide without extracting the liquid hydrogen from the reservoir. Consequently, in a case where the liquid hydrogen stored in the reservoir is intended to be supplied to a consumer, the carbon dioxide can be liquefied without causing a decrease in the liquid hydrogen to be supplied to the consumer.

Advantageous Effects of Invention

The present invention makes it possible to provide a liquid hydrogen production facility capable of efficiently liquefying carbon dioxide that occurs during the process of generating hydrogen gas. The present invention also makes it possible to provide a hydrogen gas production facility capable of liquefying carbon dioxide that occurs during the process of generating hydrogen gas without causing a decrease in liquid hydrogen to be supplied to a consumer.

DESCRIPTION OF EMBODIMENTS

Figure 1:
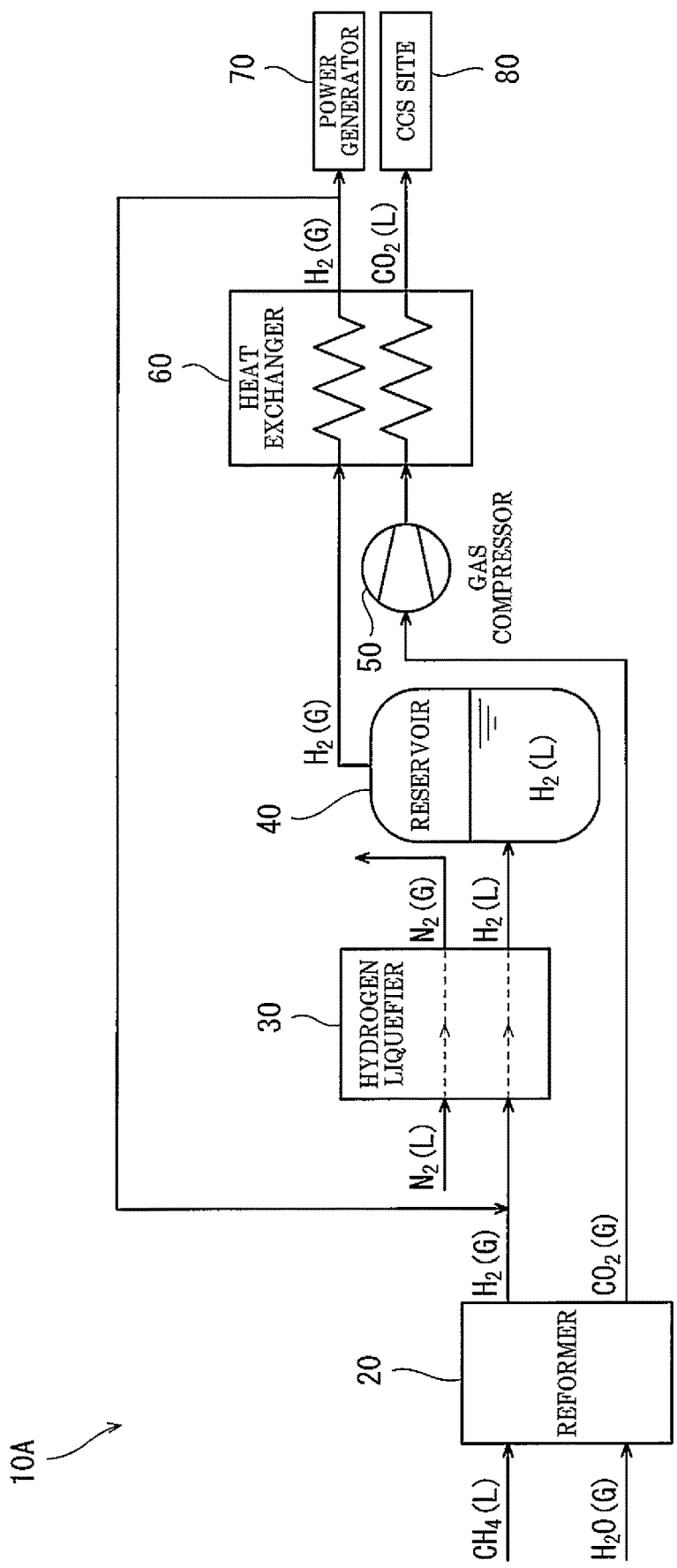
FIG. 1 shows a schematic configuration of a liquid hydrogen production facility according to Embodiment 1 of the present invention.

Hereinafter, a description is given of liquid hydrogen production equipment according to embodiments of the present invention with reference to the drawings. It should be noted that the present invention is not limited to these embodiments. In the drawings, the same or corresponding elements are denoted by the same reference signs, and repeating the same descriptions is avoided below.

In the description below and in the drawings, if "(G)" is added at the end of a chemical formula, it means that the substance represented by the chemical formula is in a gaseous state. Similarly, if "(L)" is added at the end of a chemical formula, it means that the substance represented by the chemical formula is in a liquid state.

1. Embodiment 1

(Overall Configuration)

FIG. 1 shows a liquid hydrogen production facility 10A according to Embodiment 1 of the present invention. The liquid hydrogen production facility 10A according to the present embodiment includes a reformer 20, a hydrogen liquefier 30, and a reservoir 40. The reformer 20 generates hydrogen gas $H_2$ (G) by reforming methane $CH_4$(L) (a hydrocarbon) that is contained in liquefied natural gas (LNG) as a major component. The hydrogen liquefier 30 generates liquid hydrogen $H_2$ (L) by liquefying the hydrogen gas $H_2$ (G). The reservoir 40 is a reservoir for storing the liquid hydrogen $H_2$ (L). The liquid hydrogen production facility 10A further includes a heat exchanger 60. The heat exchanger 60 causes heat exchange between boil-off gas that occurs in the reservoir 40 and carbon dioxide $CO_2$ (G) that occurs during the process of generating the hydrogen gas $H_2$ (G) to liquefy the carbon dioxide $CO_2$ (G).

(Reformer 20)

The reformer 20 generates the hydrogen gas $H_2$ (G) by reforming the aforementioned methane $CH_4$(L) by using steam $H_2O$ (G). Specifically, the reformer 20 generates the hydrogen gas $H_2$ (G) from the methane $CH_4$ (L) by steam reforming. The hydrogen gas $H_2$ (G) generated by the reformer 20 is fed to the hydrogen liquefier 30. Also, the carbon dioxide $CO_2$ (G) that occurs during the process of generating the hydrogen gas $H_2$ (G) is fed to a gas compressor 50, which will be described below.

(Hydrogen Liquefier 30)

The hydrogen liquefier 30 cools the hydrogen gas $H_2$ (G) generated by the reformer 20 with use of the heat of vaporization of liquid nitrogen $N_2$ (L), thereby liquefying the hydrogen gas $H_2$ (G) to generate liquid hydrogen $H_2$ (L). The liquid hydrogen $H_2$ (L) generated by the hydrogen liquefier 30 is fed to the reservoir 40. For example, after cooling the hydrogen gas $H_2$ (G) with use of the heat of vaporization of the liquid nitrogen $N_2$ (L), the hydrogen liquefier 30 may further cool the hydrogen gas $H_2$ (G) by using a heat pump, and thereafter, the hydrogen liquefier 30 may cause adiabatic expansion of the hydrogen gas $H_2$ (G) to liquefy the hydrogen gas $H_2$ (G), thereby generating liquid hydrogen $H_2$ (L).

During the process of generating the liquid hydrogen $H_2$ (L), nitrogen gas $N_2$ (G) occurs as a result of vaporization of the liquid nitrogen $N_2$ (L). Since the nitrogen gas $N_2$ (G) is in a low-temperature state, for example, the nitrogen gas $N_2$ (G) may be heated to a predetermined temperature, and then discharged into the atmosphere. It should be noted that the liquid hydrogen $H_2$ (L) stored in the reservoir 40 may be, for example, loaded into a transporter, such as a ship or a vehicle, and transported to its destination.

(Reservoir 40)

The reservoir 40 stores the liquid hydrogen $H_2$ (L) generated by the hydrogen liquefier 30. Since the liquid hydrogen $H_2$ (L) is in an extremely low temperature state of about −253° C., the reservoir 40 has adiabatic cooling capability. However, even though the reservoir 40 has adiabatic cooling capability, the liquid hydrogen $H_2$ (L) still naturally vaporizes little by little in the reservoir 40. That is, boil-off gas (i.e., hydrogen gas $H_2$ (G)) occurs in the reservoir 40. The boil-off gas is fed to the heat exchanger 60.

(Heat Exchanger 60)

The heat exchanger 60 causes heat exchange between the boil-off gas that occurs in the reservoir 40 and the carbon dioxide $CO_2$ (G) that occurs during the process of generating the hydrogen gas $H_2$ (G) by the reformer 20 to liquefy the carbon dioxide $CO_2$ (G). The carbon dioxide $CO_2$ (G) is not liquefied when it is in a normal-temperature and normal-pressure state. For this reason, the carbon dioxide $CO_2$ (G) is fed to the heat exchanger 60 after being compressed by the gas compressor 50.

The boil-off gas exchanges heat with the carbon dioxide $CO_2$ (G) in the heat exchanger 60, and is then fed to a passage leading to the hydrogen liquefier 30 or fed to a power generator 70 installed in the liquid hydrogen production facility 10A. Preferably, the boil-off gas is heated to a predetermined temperature and compressed, and then fed to the passage leading to the hydrogen liquefier 30. After the hydrogen gas $H_2$ (G) is fed to the passage, the hydrogen gas $H_2$ (G) is liquefied by the hydrogen liquefier 30 again. Also, the hydrogen gas $H_2$ (G) fed to the power generator 70 is utilized as a fuel for generating electric power.

The liquefied carbon dioxide $CO_2$ (L) is transported to a CCS site 80 where the liquefied carbon dioxide $CO_2$ (L) is stored underground.

(Advantageous Effects)

In the liquid hydrogen production facility 10A according to the present embodiment, the boil-off gas that occurs in the reservoir 40 for storing the liquid hydrogen $H_2$ (L), and the carbon dioxide $CO_2$ (G) that occurs during the process of generating the hydrogen gas $H_2$ (G), are caused to exchange heat with each other, and thereby the coldness of the boil-off gas can be utilized as a cooling source for liquefying the carbon dioxide $CO_2$ (G). This makes it possible to efficiently liquefy the carbon dioxide $CO_2$ (G) in the liquid hydrogen production facility 10A.

Further, in the present embodiment, methane $CH_4$(L) contained in liquefied natural gas as a major component is fed to the reformer 20. This makes it possible to efficiently liquefy the carbon dioxide $CO_2$ (G) that occurs during the process of generating the hydrogen gas $H_2$ (G) by reforming the methane $CH_4$ (L).

2. Embodiment 2

Figure 2:
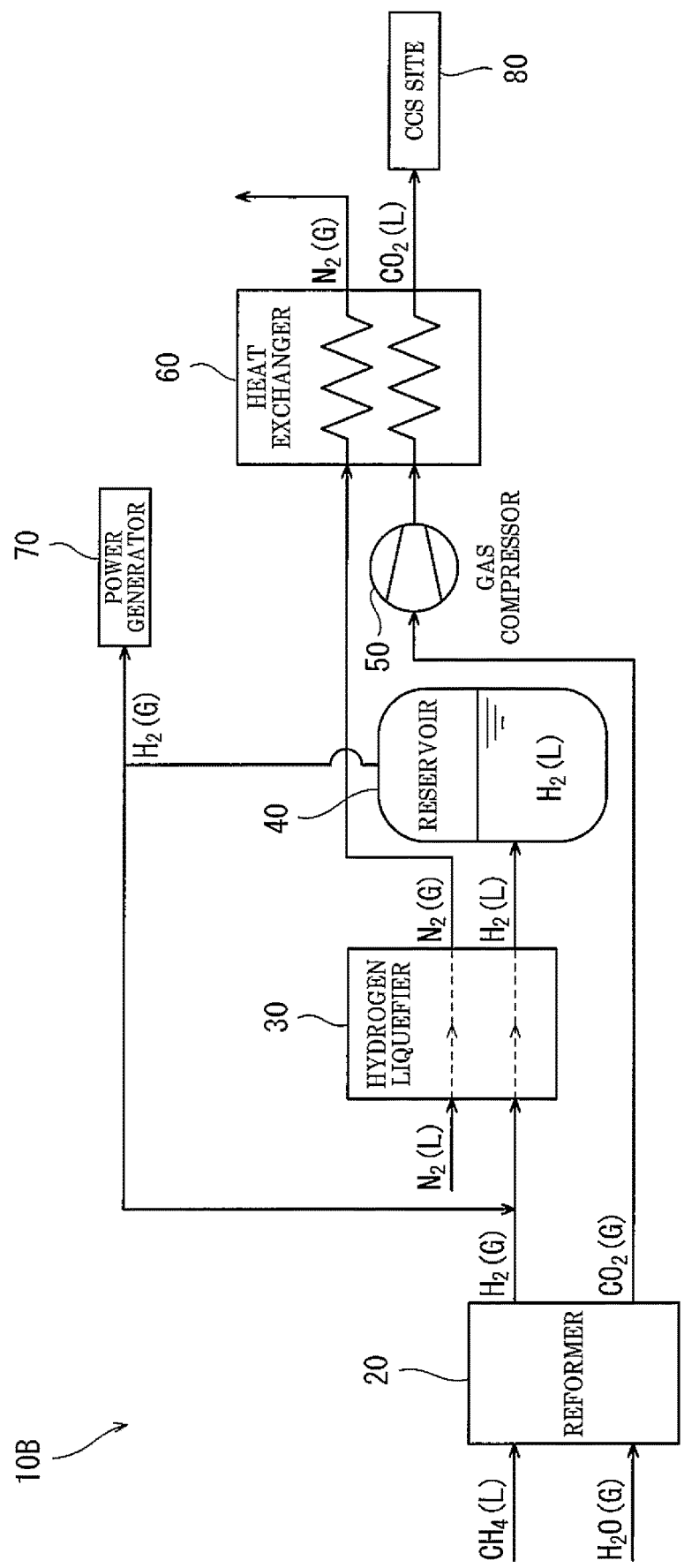
FIG. 2 shows a schematic configuration of a liquid hydrogen production facility according to Embodiment 2 of the present invention.

FIG. 2 shows a liquid hydrogen production facility 10B according to Embodiment 2 of the present invention. It should be noted that a lot of structural features of the liquid hydrogen production facility 10B according to the present embodiment are the same as those of the liquid hydrogen production facility 10A according to Embodiment 1. Therefore, common components between the liquid hydrogen production facility 10B according to Embodiment 2 and the liquid hydrogen production facility 10A according to Embodiment 1 are denoted by the same reference signs, and repeating the same descriptions is avoided below.

In the present embodiment, the nitrogen gas $N_2$ (G) that occurs during the process of generating liquid hydrogen $H_2$ (L) by the hydrogen liquefier 30 is fed to the heat exchanger 60. Further, in the present embodiment, the boil-off gas that occurs in the reservoir 40 (i.e., hydrogen gas $H_2$ (G)) is fed to the passage leading to the hydrogen liquefier 30 or to the power generator 70 installed in the liquid hydrogen production facility 10B. Preferably, the boil-off gas is heated to a predetermined temperature and compressed, and then fed to the passage leading to the hydrogen liquefier 30. After the hydrogen gas $H_2$ (G) is fed to the passage, the hydrogen gas $H_2$ (G) is liquefied by the hydrogen liquefier 30 again. Also, the hydrogen gas $H_2$ (G) fed to the power generator 70 is utilized as a fuel for generating electric power.

(Heat Exchanger 60)

In the present embodiment, the heat exchanger 60 causes heat exchange between the nitrogen gas $N_2$ (G) that is discharged from the hydrogen liquefier 30 and the carbon dioxide $CO_2$ (G) that occurs during the process of generating the hydrogen gas $H_2$ (G) by the reformer 20 to liquefy the carbon dioxide $CO_2$ (G). During the process of liquefying the carbon dioxide $CO_2$ (G), the liquid nitrogen $N_2$ (L) vaporizes, and as a result, nitrogen gas $N_2$ (G) occurs. Since the nitrogen gas $N_2$ (G) is in a low-temperature state, for example, the nitrogen gas $N_2$ (G) may be heated to a predetermined temperature, and then discharged into the atmosphere.

Similar to Embodiment 1 described above, the liquefied carbon dioxide $CO_2$ (L) is transported to the CCS site 80 where the liquefied carbon dioxide $CO_2$ (L) is stored underground.

(Advantageous Effects)

In the liquid hydrogen production facility 10B according to the present embodiment, the nitrogen gas $N_2$ (G) that is discharged in a relatively low-temperature state from the hydrogen liquefier 30, and the carbon dioxide $CO_2$ (G) that occurs during the process of generating the hydrogen gas $H_2$ (G), are caused to exchange heat with each other, and thereby the coldness of the nitrogen gas $N_2$ (G) can be utilized as a cooling source for liquefying the carbon dioxide $CO_2$ (G). This makes it possible to efficiently liquefy the carbon dioxide $CO_2$ (G) in the liquid hydrogen production facility 10B.

3. Other Embodiments

Figure 3:
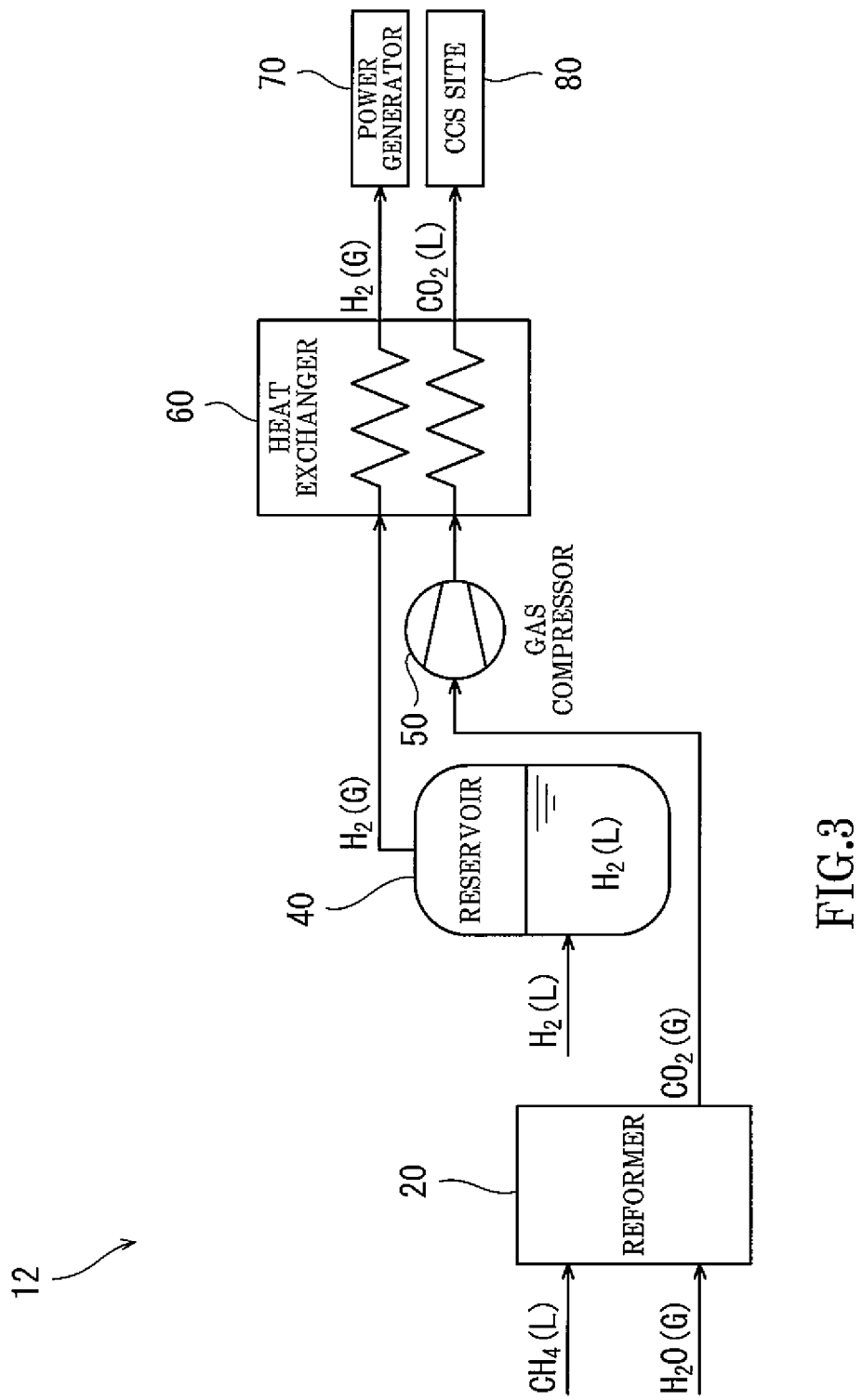
FIG. 3 shows a schematic configuration of a hydrogen gas production facility according to another embodiment.

The present invention is applicable not only to a liquid hydrogen production facility, but also to a hydrogen gas production facility. FIG. 3 shows one example of a case in which the present invention is applied to a hydrogen gas production facility. As shown in FIG. 3, a hydrogen gas production facility 12 according to the present embodiment has the same structure as that of the above-described liquid hydrogen production facility 10A according to Embodiment 1, except that the hydrogen gas production facility 12 according to the present embodiment does not include the hydrogen liquefier 30 and its accompanying various lines. Therefore, common components between the hydrogen gas production facility 12 according to the present embodiment and the liquid hydrogen production facility 10A according to Embodiment 1 are denoted by the same reference signs, and repeating the same descriptions is avoided below.

It should be noted that, specifically, the aforementioned various lines include a line through which the hydrogen gas $H_2$ (G) is supplied to the hydrogen liquefier 30 and a line through which the liquid nitrogen $N_2$ (L) is supplied to the hydrogen liquefier 30. The various lines also include a line through which the liquid hydrogen $H_2$ (L) is discharged from the hydrogen liquefier 30 and a line through which the nitrogen gas $N_2$ (G) is discharged from the hydrogen liquefier 30. The various lines further include a line through which the boil-off gas that has occurred in the reservoir 40 is, after exchanging heat with the carbon dioxide $CO_2$ (G) in the heat exchanger 60, fed to the passage leading to the hydrogen liquefier 30.

The reservoir 40 of the present embodiment is a reservoir for storing the liquid hydrogen $H_2$ (L), which is supplied from the outside. For example, the liquid hydrogen $H_2$ (L) may be, after being produced in an external liquid hydrogen production facility, loaded into and transported by a transporter, such as a ship or a vehicle, and then supplied to the reservoir 40.

(Advantageous Effects)

In the hydrogen gas production facility 12 according to the present embodiment, the boil-off gas that occurs in the reservoir 40 for storing the liquid hydrogen $H_2$ (L) supplied from the outside, and the carbon dioxide $CO_2$ (G) that occurs during the process of generating the hydrogen gas $H_2$ (G), are caused to exchange heat with each other, and thereby the coldness of the boil-off gas can be utilized as a cooling source for liquefying the carbon dioxide $CO_2$ (G). This makes it possible to liquefy the carbon dioxide $CO_2$ (G) without extracting the liquid hydrogen $H_2$ (L) from the reservoir 40. Consequently, in a case where the liquid hydrogen $H_2$ (L) stored in the reservoir 40 is intended to be supplied to a consumer, the carbon dioxide $CO_2$ (G) can be liquefied without causing a decrease in the liquid hydrogen $H_2$ (L) to be supplied to the consumer.

4. Variations

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

In the above-described embodiments, the cases have been described, in which the hydrocarbon is methane $CH_4$(L) contained in liquefied natural gas as a major component. However, the hydrocarbon is not thus limited. Specifically, the hydrocarbon may be ethane contained in liquefied natural gas as a major component, or propane contained in liquefied petroleum gas (LPG) as a major component, or a different kind of hydrocarbon.

The above embodiments have described the cases in which the reforming performed by the reformer 20 is steam reforming using steam $H_2O$ (G). However, the reforming performed by the reformer 20 is not thus limited. Specifically, catalytic reforming or a different type of reforming may be adopted as the reforming performed by the reformer 20, so long as the reformer 20 generates hydrogen gas $H_2$ (G) from the hydrocarbon and discharges carbon dioxide $CO_2$ (G).

Embodiment 1 has described the case in which the boil-off gas that has occurred in the reservoir 40 and that has gone through the heat exchange in the heat exchanger 60 (i.e., hydrogen gas $H_2$ (G)) is utilized by the power generator 70 installed in the liquid hydrogen production facility 10A. However, the utilization of the boil-off gas is not thus limited. For example, the boil-off gas that has gone through the heat exchange may be utilized by different equipment installed in the liquid hydrogen production facility 10A, or may be utilized by a power generator or other equipment installed outside the liquid hydrogen production facility 10A. It should be noted that the same is true of the boil-off gas occurring in each of the reservoirs 40 of the other embodiments, and therefore, the description thereof is omitted herein.

REFERENCE SIGNS LIST

10 liquid hydrogen production facility
12 hydrogen gas production facility
20 reformer
30 hydrogen liquefier
40 reservoir
50 gas compressor
60 heat exchanger
70 power generator
80 CCS site

The invention claimed is:

1. A liquid hydrogen production facility comprising:
   a reformer configured to generate hydrogen gas by reforming a hydrocarbon, the reformer outputting the hydrogen gas to a hydrogen liquefier and carbon dioxide to a heat exchanger;
   a reservoir;
   the hydrogen liquefier, the hydrogen liquefier being configured to generate liquid hydrogen by liquefying the hydrogen gas received from the reformer, the hydrogen liquefier outputting the liquid hydrogen to the reservoir for storage; and
   the heat exchanger, the heat exchanger being configured to receive boil-off gas from the liquid hydrogen in the reservoir and the carbon dioxide from the reformer and cause heat exchange between the boil-off gas and the carbon dioxide to liquefy the carbon dioxide.

2. The liquid hydrogen production facility according to claim 1, wherein the hydrocarbon is methane.

3. The liquid hydrogen production facility according to claim 2, wherein the reformer reforms the hydrocarbon by steam reforming.

4. The liquid hydrogen production facility according to claim 1, wherein the reformer reforms the hydrocarbon by steam reforming.

5. A liquid hydrogen production facility comprising:
   a reformer configured to generate hydrogen gas by reforming a hydrocarbon, the reformer outputting the hydrogen gas to a hydrogen liquefier and carbon dioxide to a heat exchanger;
   a hydrogen liquefier configured to receive liquid nitrogen and generate liquid hydrogen by liquefying the hydrogen gas received from the reformer, by cooling the hydrogen gas with use of heat of vaporization of the liquid nitrogen, the hydrogen liquefier outputting nitrogen gas to the heat exchanger; and
   the heat exchanger, the heat exchanger being configured to receive the nitrogen gas from the hydrogen liquefier and cause heat exchange between the nitrogen gas and the carbon dioxide to liquefy the carbon dioxide.

6. The liquid hydrogen production facility according to claim 5, wherein the hydrocarbon is methane.

7. The liquid hydrogen production facility according to claim 5, wherein the reformer reforms the hydrocarbon by steam reforming.

* * * * *